US012099502B2

(12) United States Patent
Nagy et al.

(10) Patent No.: US 12,099,502 B2
(45) Date of Patent: *Sep. 24, 2024

(54) NLP METHODS AND SYSTEMS FOR QUERYING DATA SETS

(71) Applicant: SEEK AI INC., New York, NY (US)

(72) Inventors: Sarah Nagy, New York, NY (US); Raz Besaleli, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/321,503

(22) Filed: May 22, 2023

(65) Prior Publication Data

US 2024/0070152 A1    Feb. 29, 2024

Related U.S. Application Data

(60) Provisional application No. 63/344,346, filed on May 20, 2022.

(51) Int. Cl.
*G06F 16/00* (2019.01)
*G06F 16/215* (2019.01)
*G06F 16/242* (2019.01)
*G06F 16/2453* (2019.01)

(52) U.S. Cl.
CPC ...... *G06F 16/24539* (2019.01); *G06F 16/215* (2019.01); *G06F 16/243* (2019.01)

(58) Field of Classification Search
CPC ................................. G06F 16/24539
USPC ................................................ 707/715
See application file for complete search history.

(56) References Cited

U.S. PATENT DOCUMENTS

| 11,157,564 B2 | 10/2021 | Prakash | |
|---|---|---|---|
| 11,442,932 B2 | 9/2022 | Yadav | |
| 2022/0067037 A1* | 3/2022 | Ranganathan | .......... G10L 15/22 707/707 |

* cited by examiner

*Primary Examiner* — Alexandria Y Bromell
(74) *Attorney, Agent, or Firm* — BakerHostetler

(57) ABSTRACT

The present invention provides methods and systems for receiving, from a user device, user input, wherein the user input comprises a query comprising conversational language. Based on determining that the query is not stored in a database of queries sending, a quality assurance device may send a request for information associated with the query. The requested information may be received. Based on the request information and determining one or more previously input queries similar to the query, a response to the query may be generated. The quality assurance device may verify the response comprises a solution to the query. The query and the verified response may be stored in the database of queries. The user device may be sent the response. The present invention also provides for products produced by the methods of the present invention and for apparatuses used to perform the methods of the present invention.

27 Claims, 17 Drawing Sheets

NLP METHODS AND SYSTEMS FOR QUERYING DATA SETS

CROSS REFERENCE TO RELATED APPLICATIONS

This application claims the benefit of U.S. Provisional Application No. 63/344,346, entitled "NLP Methods and Systems For Querying Data Sets" and filed on May 20, 2022, the contents of which are incorporated by reference in their entireties as if fully set forth herein.

FIELD OF THE INVENTION

The disclosed invention is in the field of data analytics and natural language processing.

BACKGROUND OF THE INVENTION

Businesses today collect more data than ever before. With this increase in data collection, comes an increase in difficulty to extract insights and analytics from that data. Previously, when a business ran a query regarding a specific data set in order to extract certain analytics, a data scientist would write code to produce the result the business wanted. However, with the influx of data collection and reliance on extracting insights and analytics from that data, data scientists may struggle developing the code that answers the increasing demand of questions asked. Thus, there is a need for new ways to produce data analytic results from business queries without solely relying on a data scientist to write and test the code to produce those results. The disclosed inventions are directed to these and other important needs.

SUMMARY OF THE INVENTION

The present invention provides for methods comprising: receiving a user query from a user device, wherein the user query comprises conversational language; generating a paraphrased query from the user query using a natural language processor; determining that the paraphrased query is not already present in a database of queries; generating code via an artificial intelligence agent, the code comprising a solution to the paraphrased query, and generating a ticket associated with the code for verification from a quality assurance user device; verifying the code comprises a solution to the paraphrased query, by the quality assurance device and based on the ticket associated with the code; adding the paraphrased query and the verified code to the database of queries; and sending an output of the verified code to the user device.

The present invention also provides for methods comprising: receiving a user query from a user device, wherein the user query comprises conversational language; generating a paraphrased query from the user query using a natural language processor; determining that the paraphrased query is already present in a database of queries; receiving the code associated with the paraphrased query from the database of queries; and sending an output of the code to the user device.

The present invention also provides for systems comprising: a user device; a natural language processor; an artificial intelligence agent; a database of queries; a quality assurance user device; and a plurality of application programming interfaces configured to: receive a user query from the user device, wherein the user query comprises conversational language; generate a paraphrased query from the user query using the natural language processor; determine that the paraphrased query is not already present in the database of queries; generate code via the artificial intelligence agent, the code comprising a solution to the paraphrased query, and generating a ticket associated with the code for verification from the quality assurance user device; verify the code comprises a solution to the paraphrased query, by the quality assurance user device and based on the ticket associated with the code; add the paraphrased query and the verified code to the database of queries; and send an output of the verified code to the user device.

The present invention also provides for a method comprising: receiving, from a user device, user input, wherein the user input comprises a query comprising conversational language; sending, by a quality assurance device and based on determining that the query is not stored in a database of queries, a request for information associated with the query; receiving, from the user device, the requested information; generating, based on the request information and determining one or more previously input queries similar to the query, a response to the query; verifying, by the quality assurance device, the response comprises a solution to the query; storing, in the database of queries, the query and the verified response; and sending the response to the user device.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 11 illustrates an embodiment of the present invention directed to step 7 of an example use case;

FIG. 12 illustrates an embodiment of the present invention directed to step 8 of an example use case;

FIG. 13 illustrates an embodiment of the present invention directed to step 9 of an example use case;

DETAILED DESCRIPTION OF ILLUSTRATIVE EMBODIMENTS

Figure 1A:
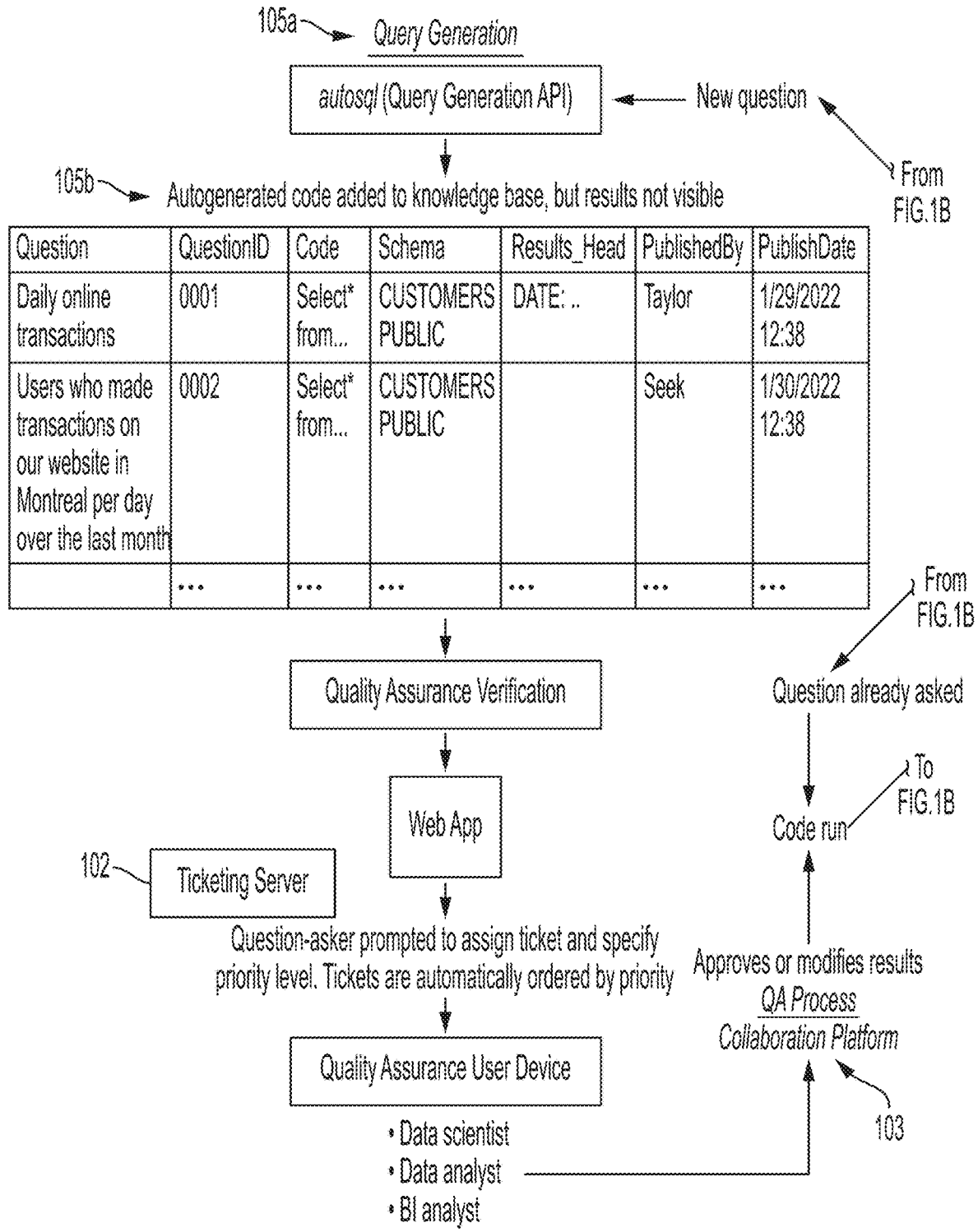
FIGS. 1A, 1B, and 1C illustrate an overview of an embodiment of the present invention directed to a workflow diagram.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

One embodiment of the invention provides a method for receiving a user query, which may comprise conversational language, from a user device. From the user query, a paraphrased query may be generated by a natural language processor. Then it may be determined if the paraphrased query is not already present in a database of queries. If the paraphrased query is not already present, code may be generated by an artificial intelligence agent. The code may comprise a solution to the paraphrased query. Additionally, a ticket associated with the code may be generated for verification purposes by a quality assurance user device. The quality assurance user device associated with the generated ticket may verify that the code comprises a solution to the paraphrased query. Once verified, the paraphrased query and the verified code may be added to the database of queries. The output of the verified code may be sent to the user device.

In some embodiments, a chat application programming interface installed on a communication tool used by the user device, may receive the user query.

In some embodiments, the natural language processor may further comprise a machine learning application programming interface.

In some embodiments, the artificial intelligence agent further may comprise a query generation application programming interface.

In some embodiments, the artificial intelligence agent and the natural language process may comprise the same machine learning model.

In some embodiments, generating the ticket associated with code may further comprise generating the ticket associated with the code by a quality assurance ticketing server. In even further embodiments, the quality assurance ticketing server may assign the quality assurance user device to the ticket for verification of the code.

In some embodiments, verifying the code may further comprise the quality assurance user device to determine that the code comprises a solution to the paraphrased query.

In some embodiments, verifying the code may further comprise the quality assurance user device to determine that the code does not comprise a solution to the paraphrased query. In such embodiments, the quality assurance user device may alter the code to comprise the solution to the paraphrased query.

Another preferred embodiment of the invention provides a method for receiving a user query, which may comprise conversational language, from a user device. From the user query, a paraphrased query is generated by a natural language processor. It is then determined if the paraphrased query is not already present in a database of queries. If the paraphrased query is determined to be already in the database of queries, the corresponding code associated with the paraphrased query is received. The output of the code is then sent to the user device.

In some embodiments, a chat application programming interface installed on a communication tool used by the user device, may receive the user query.

In some embodiments, the natural language processor may further comprise a machine learning application programming interface.

Another preferred embodiment of the invention provides a system comprising a user device, a natural language processor, an artificial intelligence agent, a database of queries, a quality assurance user device, and a plurality of application programming interfaces. The plurality of application programming interfaces is configured to receive a user query, which may comprise conversational language, from a user device. From the user query, a paraphrased query may be generated by the natural language processor. Then it may be determined if the paraphrased query is not already present in the database of queries. If the paraphrased query is not already present, code may be generated by the artificial intelligence agent. The code may comprise a solution to the paraphrased query. Additionally, a ticket associated with the code may be generated for verification purposes by the quality assurance user device. The quality assurance user device associated with the generated ticket may verify that the code comprises a solution to the paraphrased query. Once verified, the paraphrased query and the verified code may be added to the database of queries. The output of the verified code may be sent to the user device.

In some embodiments, the plurality of application programming interfaces configured to receive the user query may be further configured to receive the user query by a chat application programming interface installed on a communication tool used by the user device.

In some embodiments, the natural language processor may further comprise a machine learning application programming interface.

In some embodiments, the artificial intelligence agent may further comprise a query generation application programming interface.

In some embodiments, the artificial intelligence agent and the natural language process may comprise the same machine learning model.

In some embodiments, the plurality of application programming interfaces configured to generate the ticket associated with the code may be further configured to generate the ticket associated with the code by a quality assurance ticketing server. In even further embodiments, the quality assurance ticketing server may assign the quality assurance user device to the ticket for verification of the code.

In some embodiments, the plurality of application programming interfaces configured to verify the code may comprise the quality assurance person determining the code comprises the solution to the paraphrased query.

In some embodiments, the plurality of application programming interfaces configured to verify the code may comprise the quality assurance user device determining the code does not comprise the solution to the paraphrased code. In such embodiments, the quality assurance user device may alter the code to comprise the solution to the paraphrased query.

Another preferred embodiment of the invention provides a method for receiving, from a user device, user input, wherein the user input comprises a query comprising conversational language. Based on determining that the query is not stored in a database of queries sending, a quality assurance device may send a request for information associated with the query. The requested information may be received. Based on the request information and determining one or more previously input queries similar to the query, a response to the query may be generated. The quality assurance device may verify the response comprises a solution to the query. The query and the verified response may be stored in the database of queries. The user device may be sent the response.

In some embodiments sending the request for information associated with the query further comprises generating, by a machine learning model, assumptions associated with the query, and sending, to the user device, a request to verify the assumptions generated.

In some embodiments sending the request for information associated with the query further comprises rephrasing, by a quality assurance device and based on the query, the query, and sending, the user device, a request to verify the rephrased query.

In some embodiments determining one or more previously input queries similar to the query further comprises at least one of comparing, by a machine learning model, the query with the queries stored in the database of queries, or comparing, by a machine learning model, a query semantically similar to the query with the queries stored in the databased of queries.

In some embodiments the generating a response to the query further comprises generating, by a machine learning model, code comprising a solution to the query.

In some embodiments wherein the verifying the response comprises the solution to the query further comprises determining, by the quality assurance device, the response does not comprise the solution to the query and generating, by the quality assurance device and based on the response, a new response that comprises the solution to the query.

In some embodiments receiving the user input further comprises receiving the user input via a chat application programming interface installed on a communication tool used by the user device.

In some embodiments generating a response to the query is based on determining, by a machine learning model and based on the one or more previously input queries similar to the query, one or more assumptions associated with the query.

Figure 1B:
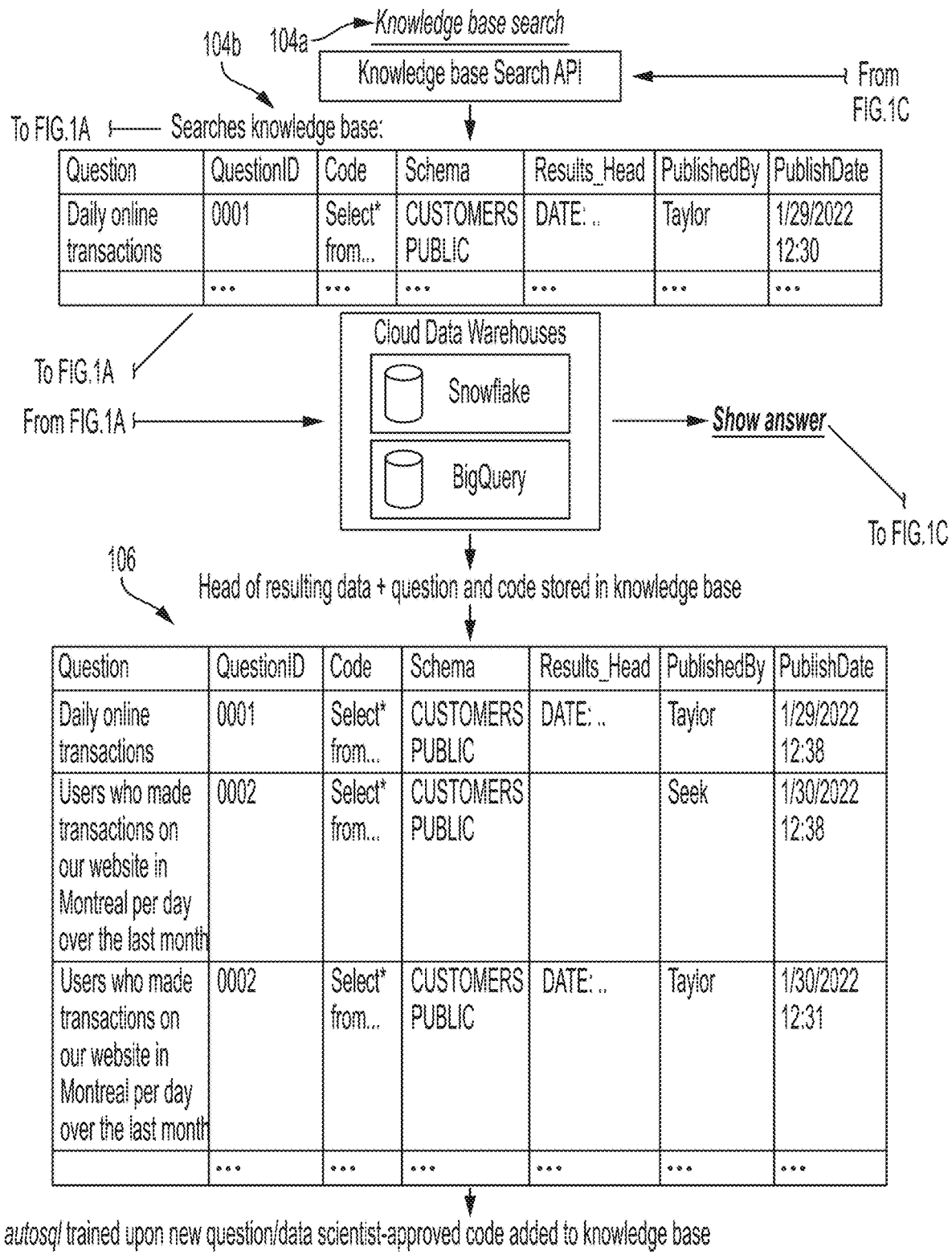
Figure 1C:
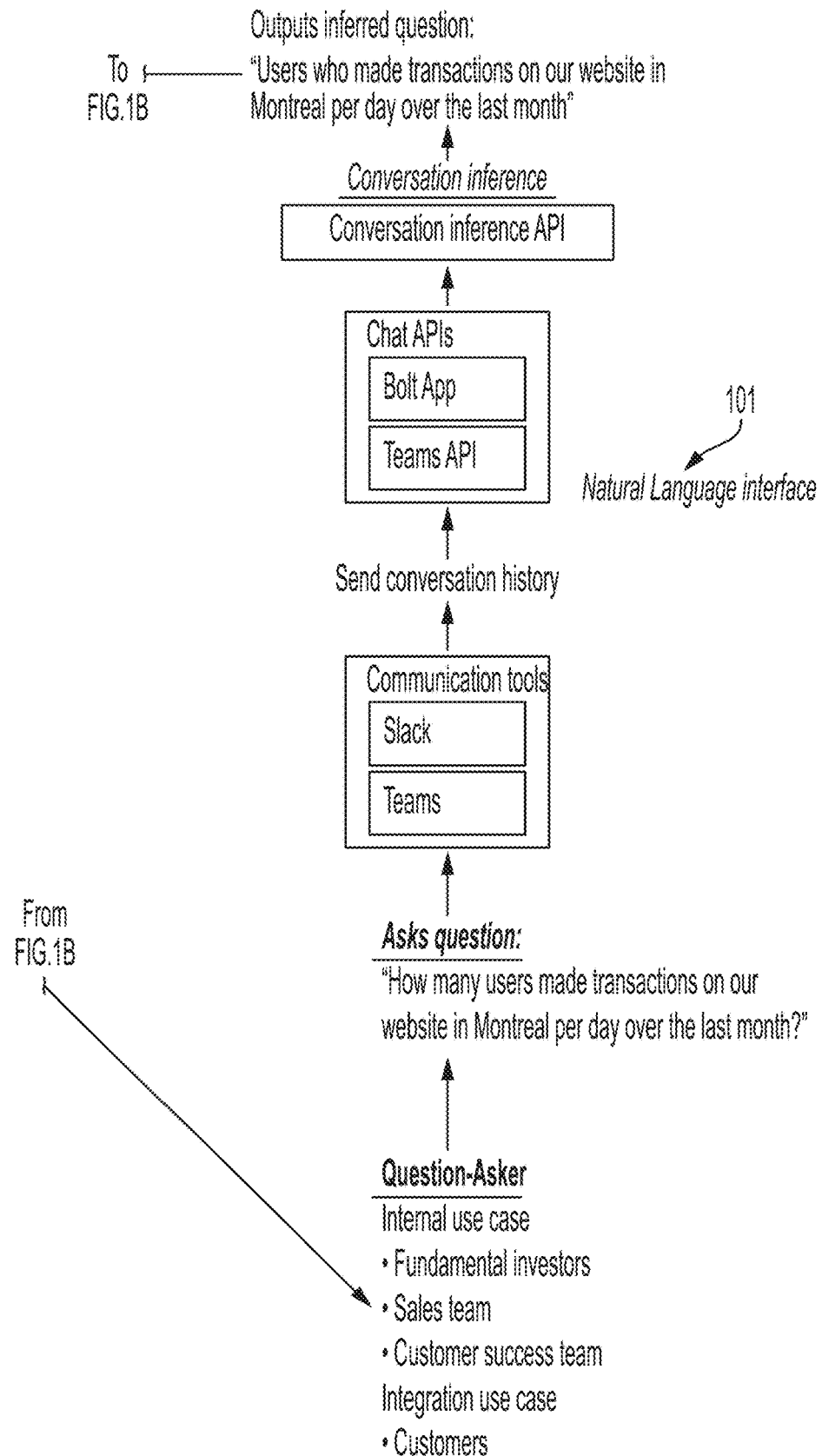

FIGS. 1A, 1B, and 1C show a workflow diagram depicting an overview of a preferred embodiment. A user device may interact with a natural language interface 101 and propose a query to be answered. The query may be in form of conversational language. The query may involve data analytics. The natural language interface 101 may be a chat application or other communication tools. The natural language interface 101 may have integrated application programming interfaces (APIs) to facilitate providing users data analytics and/or providing answers to queries. The natural language interface 101 may paraphrase the query.

A database of queries 104a may be searched to see if the paraphrased question has been previously asked. The table 104b is an example of the database of queries. If the question has been previously asked, the code associated with the paraphrased query may be run and output to the user device that provided the query.

If the question has not be previous asked, a query generator 105a may automatically generate code that answers the query. The generated code may then be added to the database of queries, as shown in table 105b. A ticket may be generated simultaneously or following the generation of the code. The ticket may be assigned to a quality assurance user device by the user device who asked the question or by a ticketing server 102. The ticket server 102 may be used for quality assurance verification of the generated code.

A quality assurance user device may use a collaboration platform 103 to verify if the generated code provides the answer to the original paraphrased query. If the code does not provide the answer to the original paraphrased query, the quality assurance user device may alter the code to produce the desired results. Once verified, the code may be sent to a cloud data warehouse that may store the code and paraphrased query into the database of queries, as table 106 shows. The code may then be run and output to the user device that provided the query.

Figure 2:
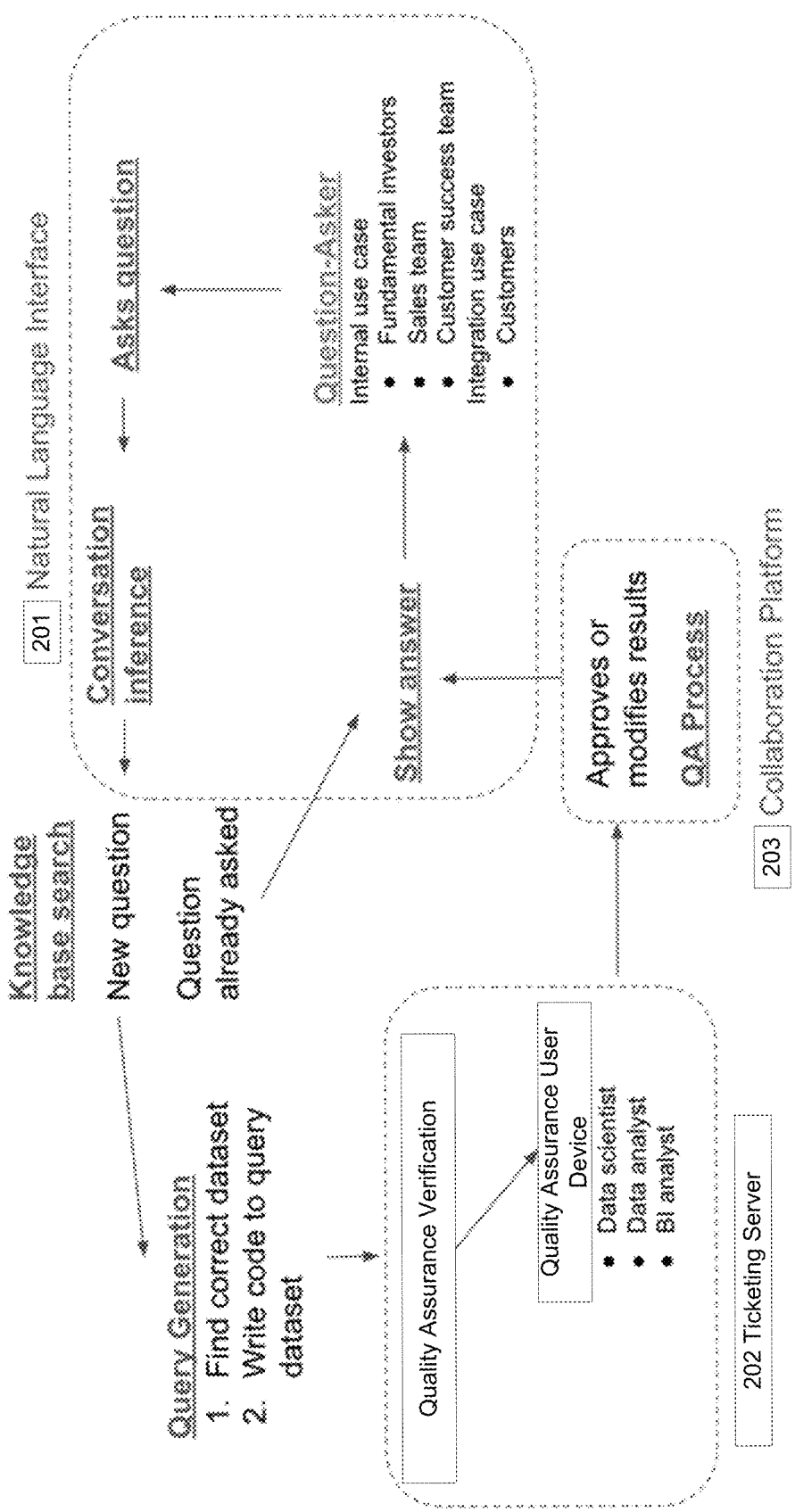
FIG. 2 illustrates an embodiment of the present invention directed to a simplified workflow diagram of the embodiment in FIGS. 1A, 1B, and 1C.

FIG. 2 shows a simplified workflow diagram of the preferred embodiment of FIGS. 1A, 1B, and 1C. The natural language interface 201 is equivalent to the natural language interface 101 in FIGS. 1A, 1B, and 1C. The ticketing server 202 may be equivalent to the ticketing server 102 in FIGS. 1A, 1B, and 1C. The collaboration platform 103 may be equivalent to the collaboration platform 103 in FIGS. 1A, 1B, and 1C.

Figure 3:
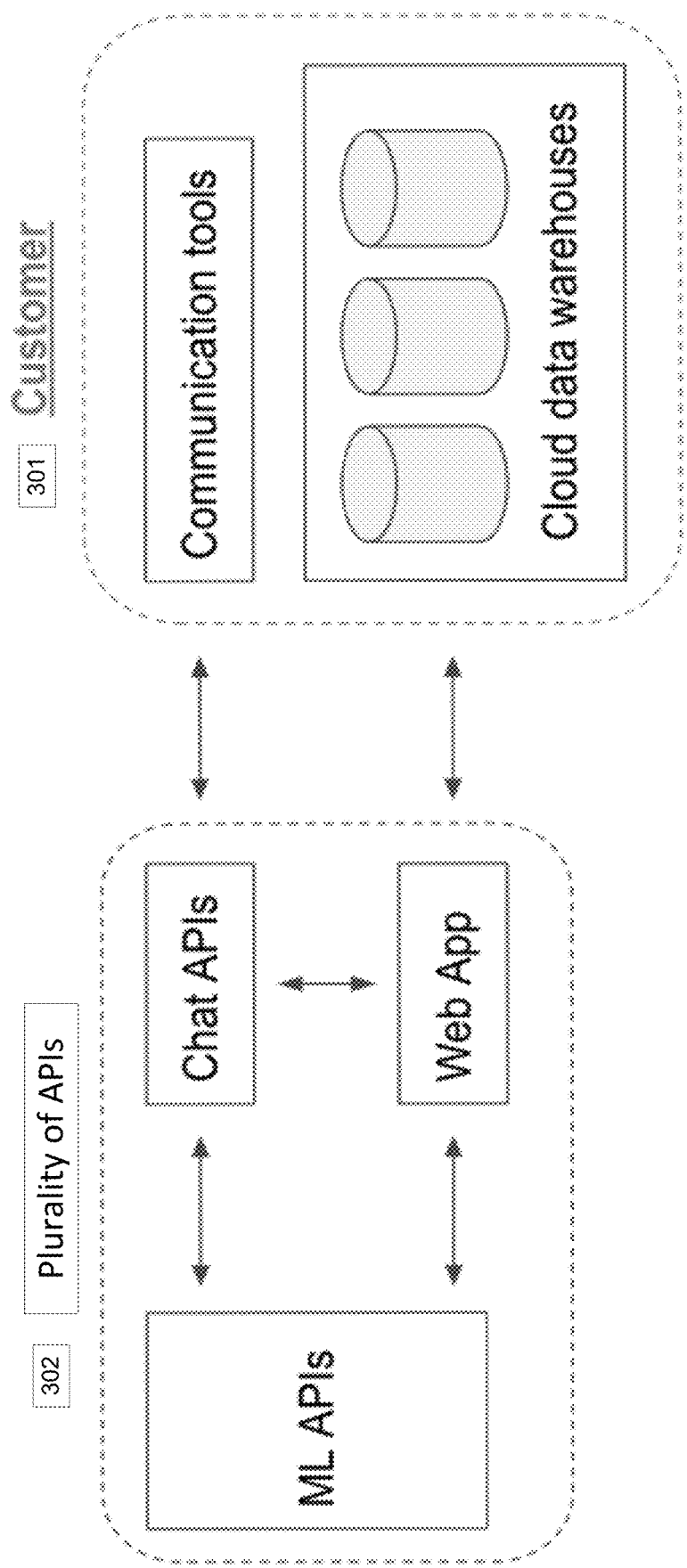
FIG. 3 illustrates an embodiment of the present invention directed to a high-level overview of an example architecture.

FIG. 3 shows a high-level overview of an example architecture of a preferred embodiment. The architecture may involve connecting two pieces of software, a customer communication tool 301 and a plurality of APIs 302. The customer communication tool 301 may be installed from an app directory or equivalent. The plurality of APIs 302 may connect to a customers' cloud data warehouses via a web app. The chat APIs may be a collection of APIs where a query gets asked by a user device. The web app may be a website application that provides access to a ticketing server and collaboration platform. The ML APIs may be a collection of APIs used to access machine learning models.

Figure 4:
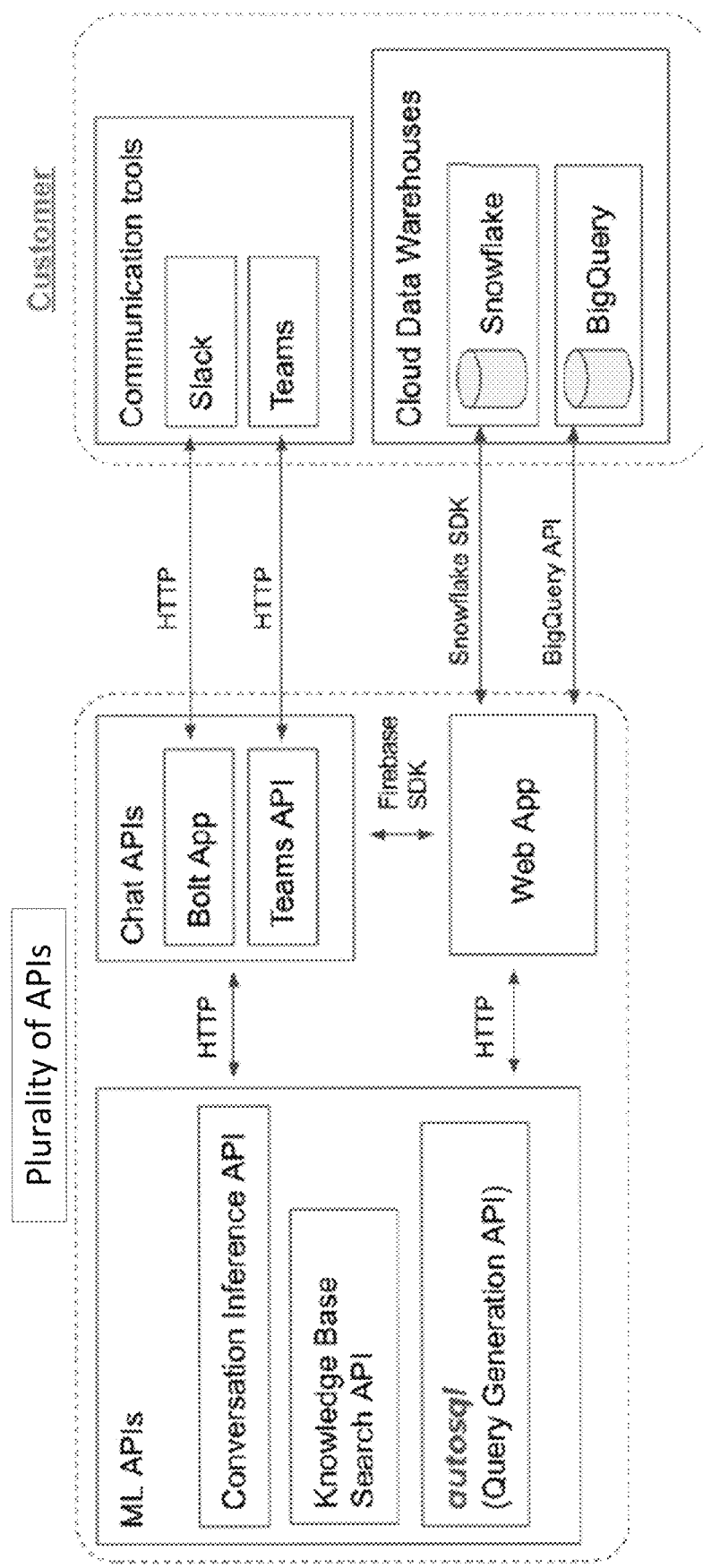
FIG. 4 illustrates an embodiment of the present invention directed to a more detailed diagram of an example architecture.

FIG. 4 shows a more detailed diagram of an example architecture of a preferred embodiment. This example architecture may support Slack and Microsoft Teams as the communication tool. A python application may be built on Slack's bolt framework to communicate with a customer's Slack application. A custom-built REST API may be used to connect to a customer's Microsoft Teams application. This example architecture may support Snowflake and BigQuery by sending and receiving data using SDKs provided by those data warehouses. This example architecture may support three key ML API microservices within a preferred embodiment: a conversation inference, a knowledge base search, which may contain a database of queries, and autosql, which may be a data warehouse search and natural language-to-SQL generation API.

The conversation inference may be used to paraphrase the conversation language and chat history leading up to the user device's query, as well as the query itself, as a simpler query. The purpose may be to give the "query asker" the opportunity to check that the communication interface is correctly understanding the query before submitting it to the query-generation algorithm. For example, the conversation inference algorithm may take as an input: "Hey data team, sorry to bug you, but I have a meeting with the COO tomorrow, and we are going to discuss the new store idea for Montreal. Can you pull the last 3 months of data for me on Montreal purchases on our website, by day?" and will paraphrase the query to "Pull the last 3 months of Montreal purchases on our website, by day."

Example pseudocode for conversation inference may be:

```
"def infer_question_from_conversation(conversation_history):
    prompt = generate_prompt(conversation_history)
    question = paraphrase_with_gpt3(prompt)
    return question"
```

The knowledge base search, which may contain a database of queries may be used as a collection of queries and associated code that has been stored previously by the web app. The database of queries may be searched to determine if the query has been asked previously. If the query has been asked previously, the associated code is run and outputted to the user device who asked the query. If not, then new code may be generated using autosql.

Example pseudocode for the knowledge database search may be:

```
"def search_knowledge_base(question, knowledge_base):
    top_result = gpt3_semantic_search(question,
    knowledge_base.questions)
    if evaluate_likelihood(top_result.likelihood):
        return top_result
    else:
        return 'No matching question found.'"
```

The autosql, or query generation API, may recommend the most likely schema/data warehouse and then generates SQL code to query this schema. The database's metadata, i.e., the schema as well as user-provided metadata taken from data dictionaries/data catalogs, may be used as an input to the semantic search.

Example pseudocode for autosql may be:

```
"databases = get_databases( )
    def pick_schema(question):
        top_result = gpt3_semantic_search(question, databases.metadata)
        return top_result
    def write_query(question, schema):
        prompt = generate_prompt(question, schema)
        sql = generate_sql_with_codex(prompt)
        return sql
```
```
    def autosql(question):
        schema = pick_schema(question)
        query = write_query(question, schema)
        return query"
```

Figure 5:
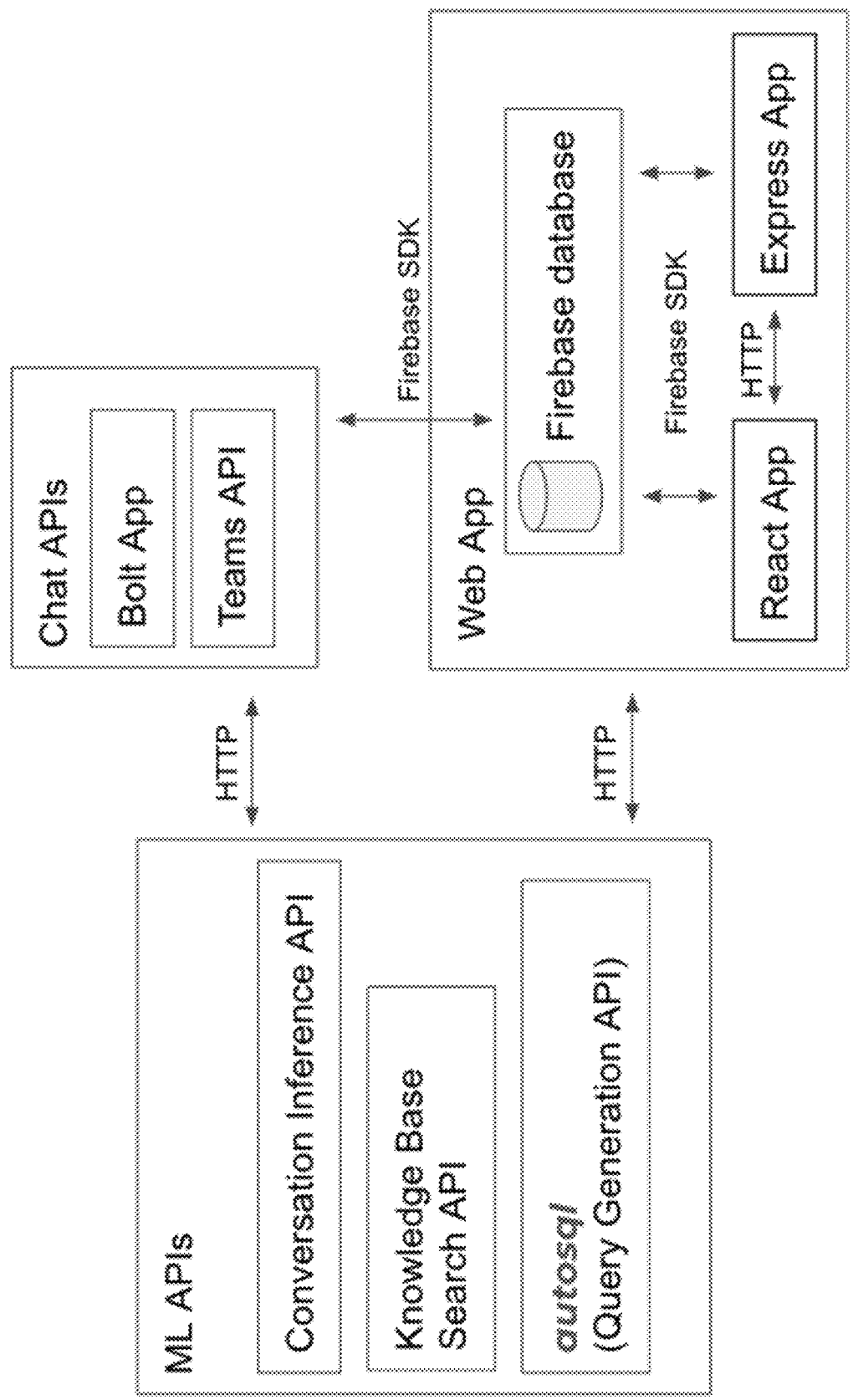
FIG. 5 illustrates an embodiment of the present invention directed to a detailed example of a web application.

FIG. 5 shows a more detailed example of a web application of a preferred embodiment. The web application may use the Firebase, Express, React, Node.js (FERN) stack. Other equivalent stacks may be used. A React app may be used to deliver the front-end user experience in the browser, and an Express/Node.js app may be used to manage the front-end user experience in the browser. Firebase's Realtime Database may be used to store user device data and Firebase Authentication is used to manage user device credentials. Other noSQL databases and/or equivalents may be used instead of Firebase, i.e., Mongo, Parse, Back4App, DynamoDB, AWS Amplify and/or others.

When a user device asks a query via a communication platform, the chat API may be used to handle the query and store/retrieve relevant data related to the query in the same Firebase database used by the web app. This may allow the user device's communication tool and the web app to communicate with each other.

Figure 6:
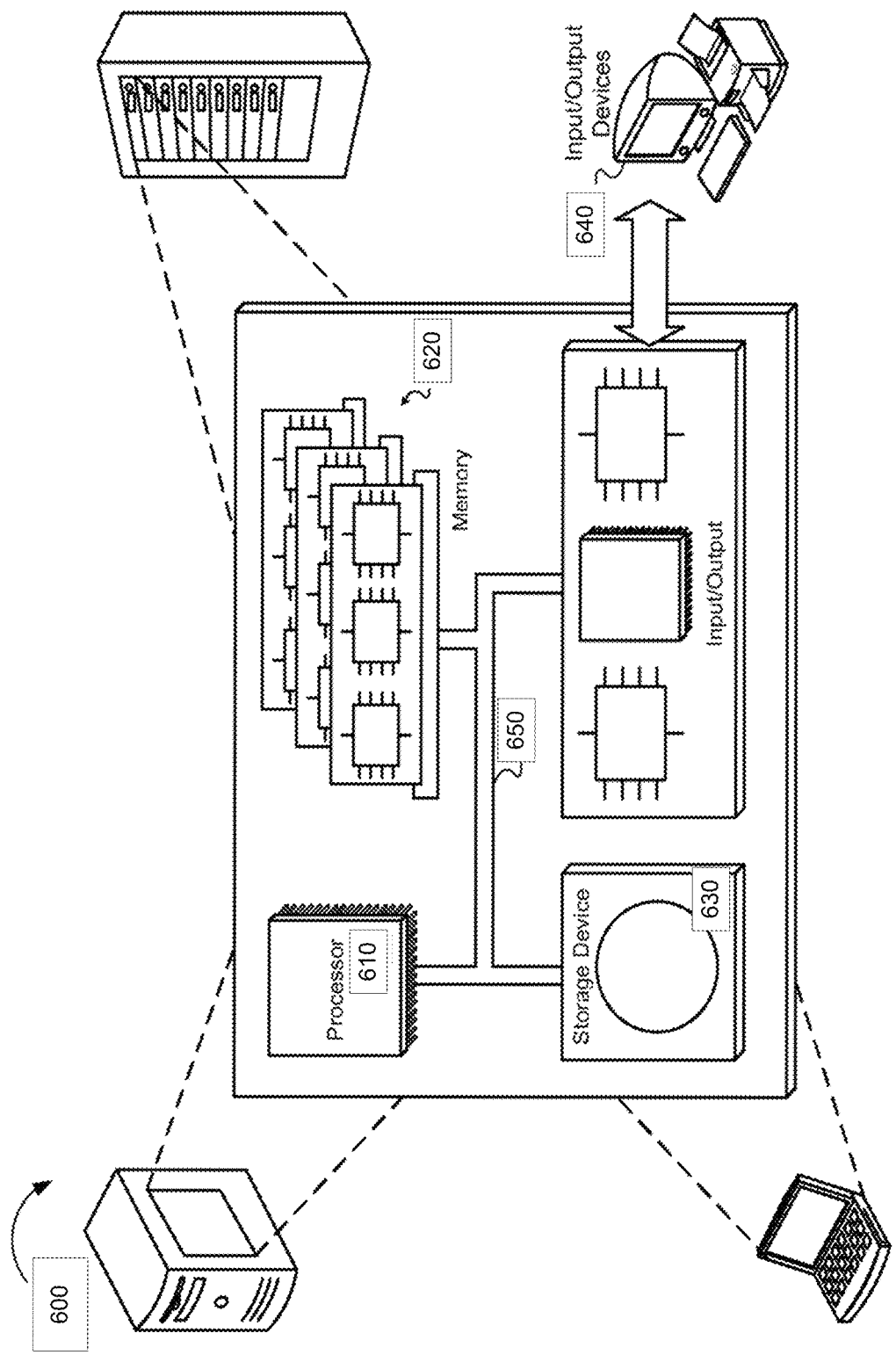
FIG. 6 illustrates an embodiment of the present invention directed to a schematic diagram of a generic computer system.

FIG. 6 is a schematic diagram of a generic computer system 600. The system 600 can be used for practicing operations described, for example in association with the methods described herein. The system 600 can include a processor 610, a memory 620, a storage device 630, and input/output devices 640. Each of the components 610, 620, 630, and 640 are interconnected using a system bus 680. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 is a computer readable medium such as volatile or non-volatile that stores information within the system 600. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 7:
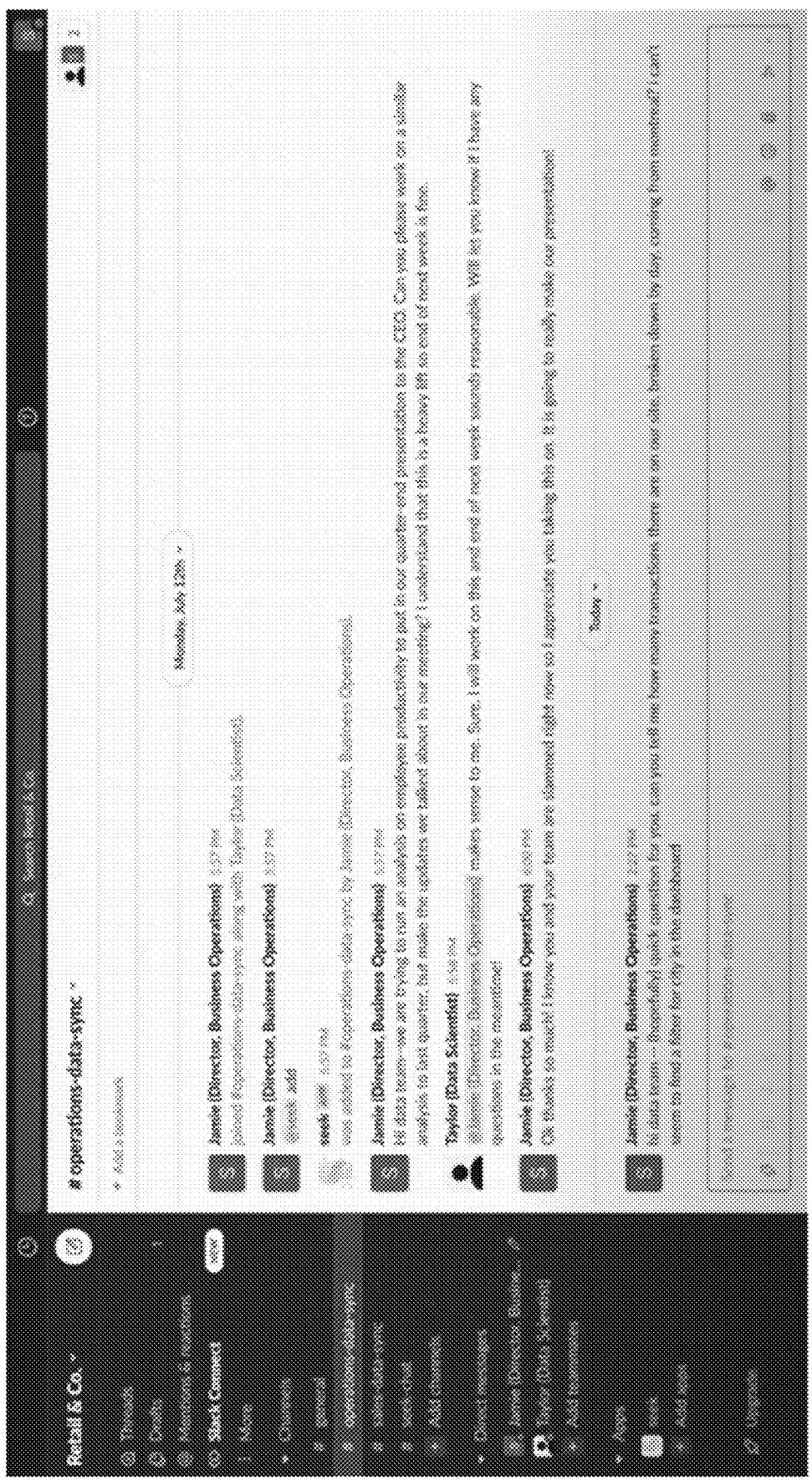
FIG. 7 illustrates an embodiment of the present invention directed to step 1 of an example use case.

FIG. 7 shows step 1 of an example use case of a preferred embodiment. This example shows a user device asking a query on the Slack communication tool.

Figure 8:
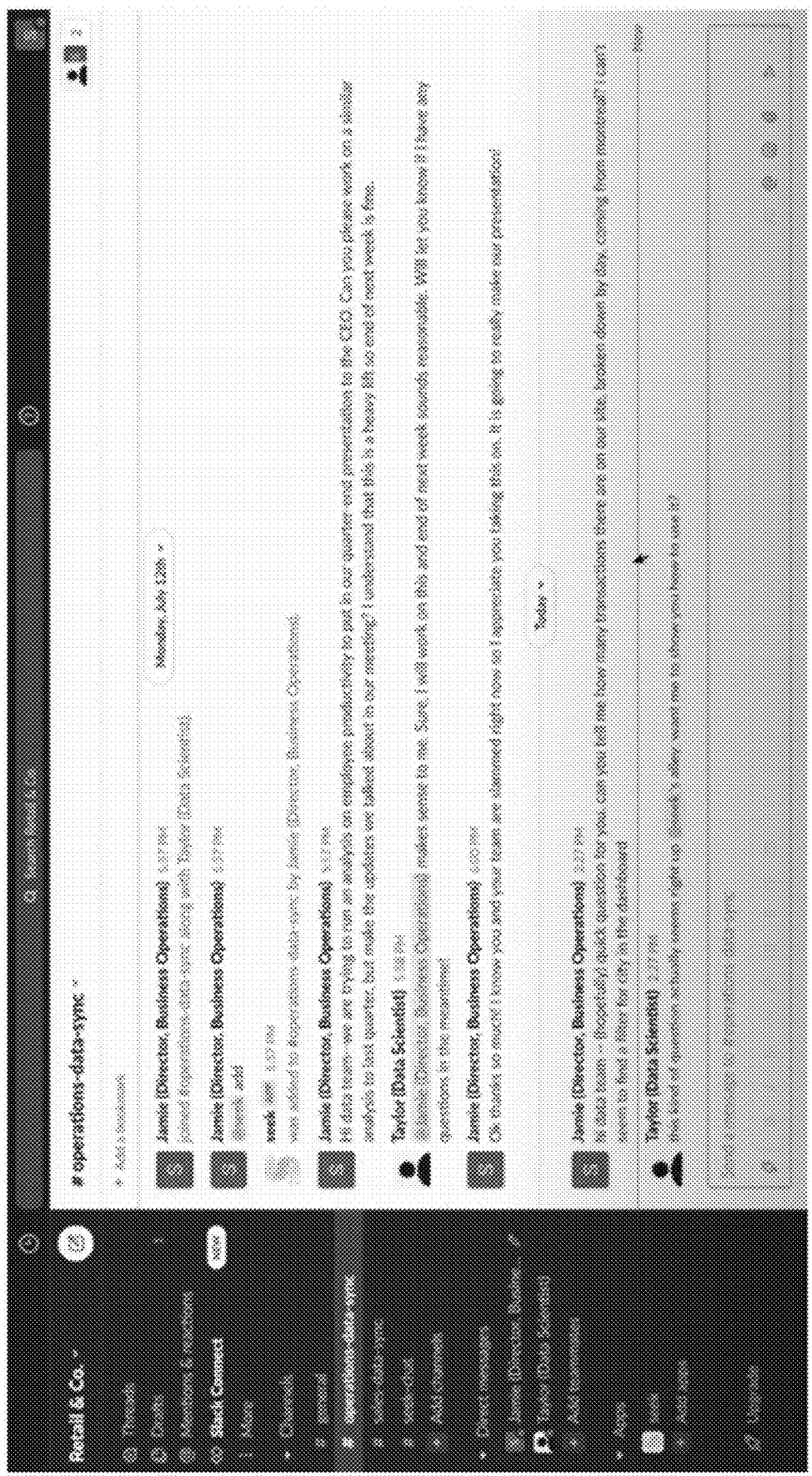
FIG. 8 illustrates an embodiment of the present invention directed to step 2 of an example use case.

FIG. 8 shows step 2 of an example use case of a preferred embodiment. This example shows a quality assurance user device being directed to the query. Slack Bolt may be running in this example use case.

Figure 9:
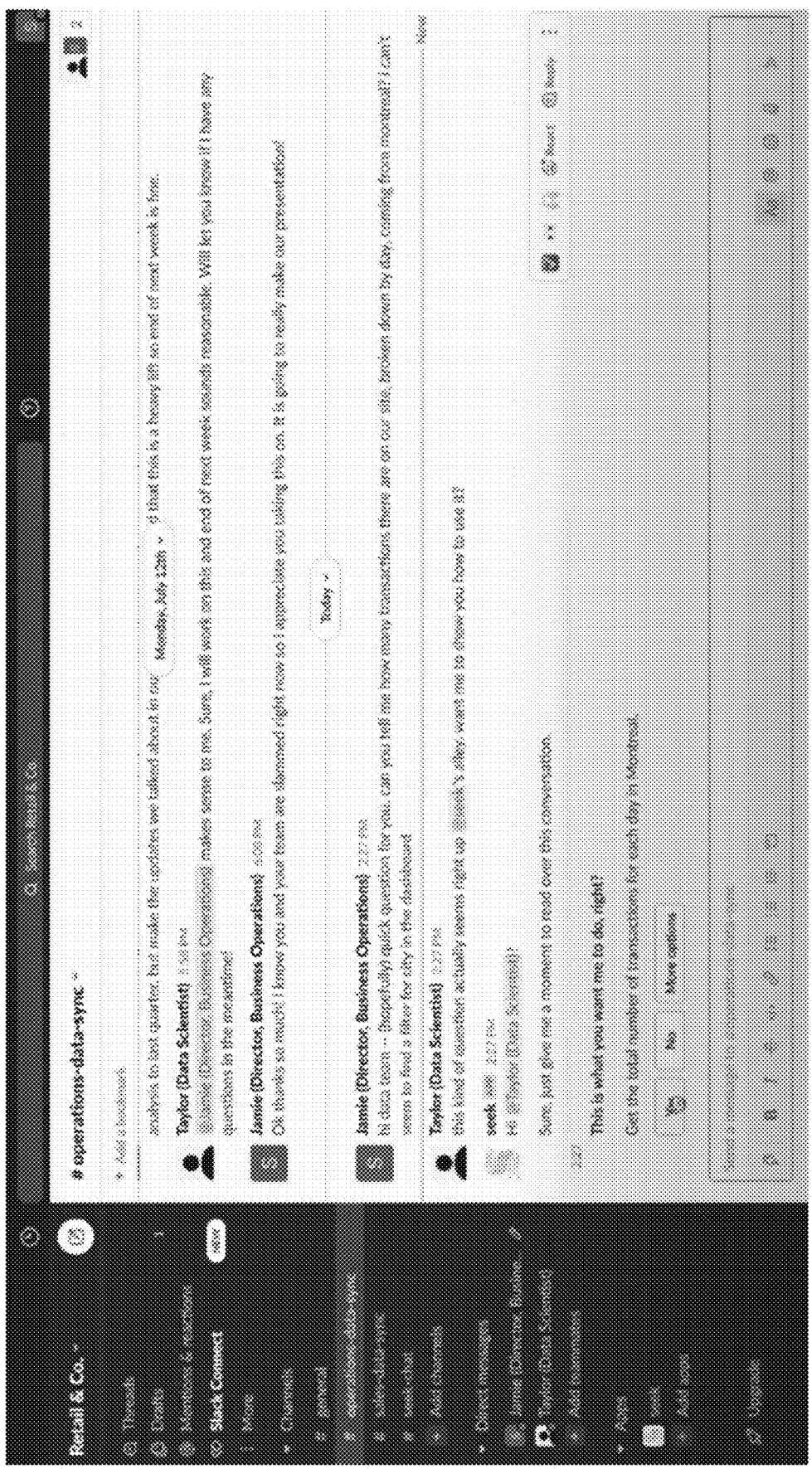
FIG. 9 illustrates an embodiment of the present invention directed to step 3 of an example use case.

FIG. 9 shows step 3 of an example use case of a preferred embodiment. This example shows the conversation inference may be invoked. The conversation inference may paraphrase the query. The conversation history may be entered into the conversation inference engine. Example pseudo code of this may be:

"result=client.conversations_history
 (channel=channel_id) inference.confirm_question(result, body, client, say"

Figure 10:
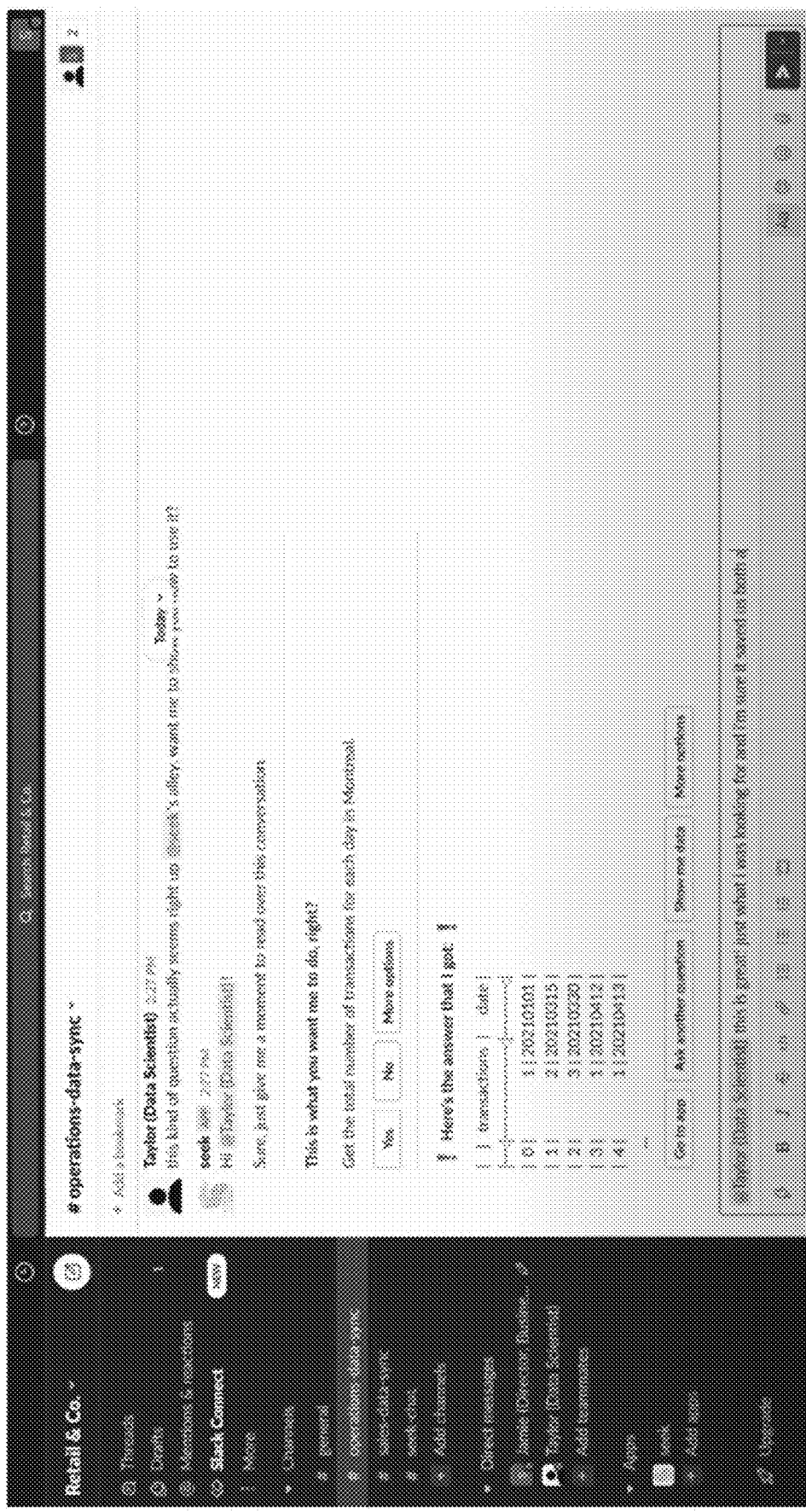
FIG. 10 illustrates an embodiment of the present invention directed to step 4 of an example use case.

FIG. 10 shows step 4 of an example use case of a preferred embodiment. This example shows the knowledge base search may be ran after the query is paraphrased. If the search finds the query has been asked previously, it runs the associated code and outputs the result back to the user device. This may be accomplished by sending the paraphrased query as SQL input to the SDK of the customer's/user device's data warehouse. The resulting query results are then delivered via the SDK connecting to the customer's/user device's data warehouse. The results of the code are then displayed to the user device in Slack.

Step 5 of the example use case may be to determine whether the workflow may end. If the query was previously asked and the results of the associated code are displayed to the user device, then workflow may end. If the query was not asked, the workflow proceeds to step 6.

Step 6 of the example use case may be to use autosql to generate code to answer the query. New queries may be added to the database of queries of the knowledge base search. The database may be a NoSQL database or equivalent. Example pseudo code of the inputs and outputs of autosql may be:

```
input:
{
    'schema':
        [
            {"name": [schema name, e.g. "purchases"],
            "metadata": [schema metadata, e.g. "{'Description':
            'Purchase data for online and brick-and-mortar businesses'}"],
            "tables":
                [
                {"name":[table name, e.g. "online"],
                "columns":[table columns, e.g.
                ["day","item_id","customer_id","amount"]]}
                ]
            },
            ...
        ],
        'question': [question, e.g. "how many online transactions were
        there in Montreal?"]
}
output:
{
    'sql': [output SQL, e.g. "select a.date, count(a.column_a) as
    transactions from customers.public.customertransactions a inner join
    customers.public.customerlocations b on a.customer_id =
    b.customer_id where lower(customers.public.customerlocations.city) =
    'montreal' and customers.public.customertransactions.join_date >=
    date_add(date, interval 1 year)"],
    'schema': [output schema, e.g. "customers.public"]
}
```

Figure 11:
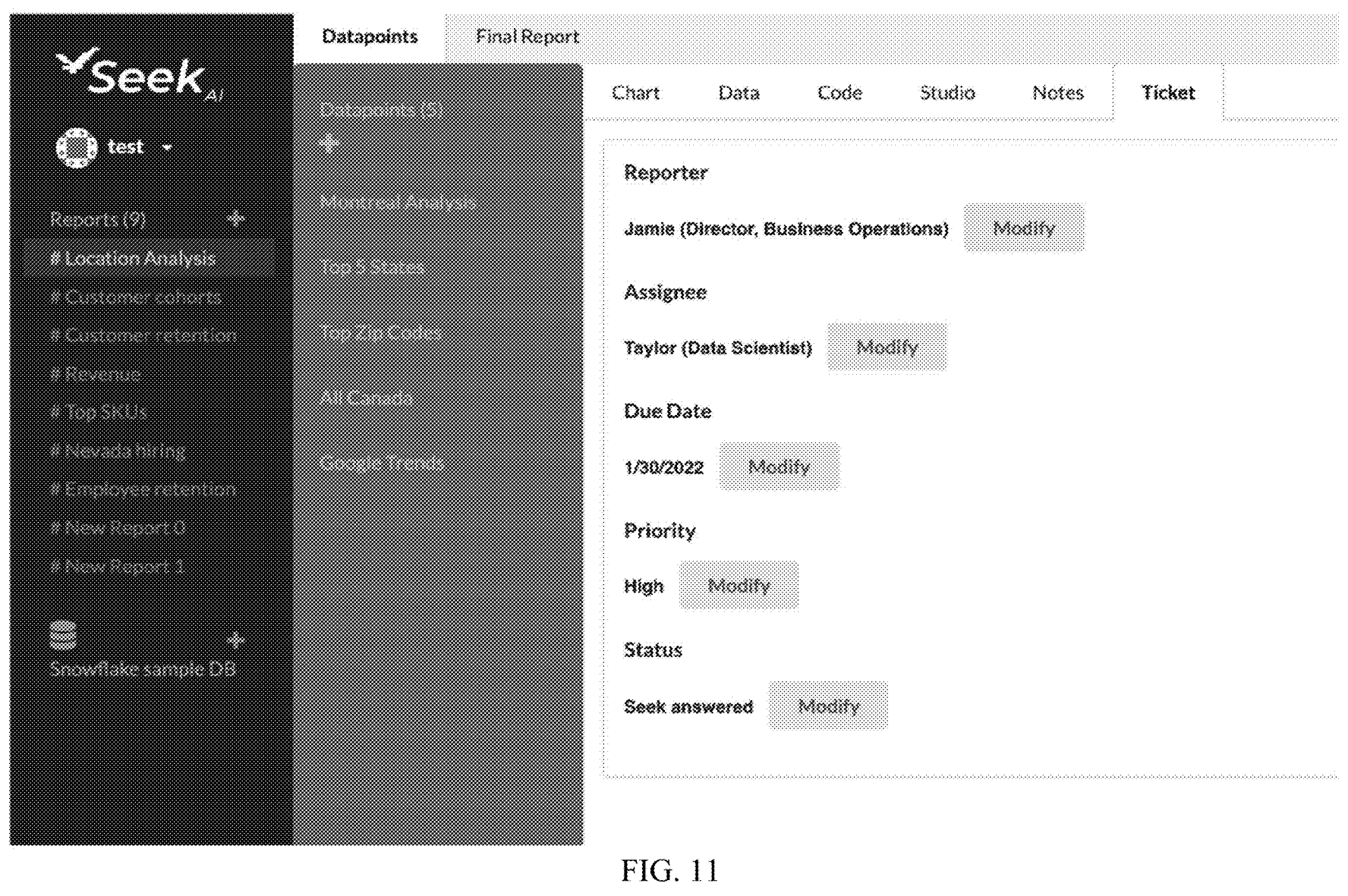

FIG. 11 shows step 7 of an example use case of a preferred embodiment. This example shows a quality assurance user device may be assigned to a ticket generated to verify the generated code. The ticket may be generated simultaneously or proceeding the generation of the code. The tickets may be stored in a table in a NoSQL database, by a ticketing server or equivalent, that functions similarly to the other databases used in the embodiment.

Figure 12:
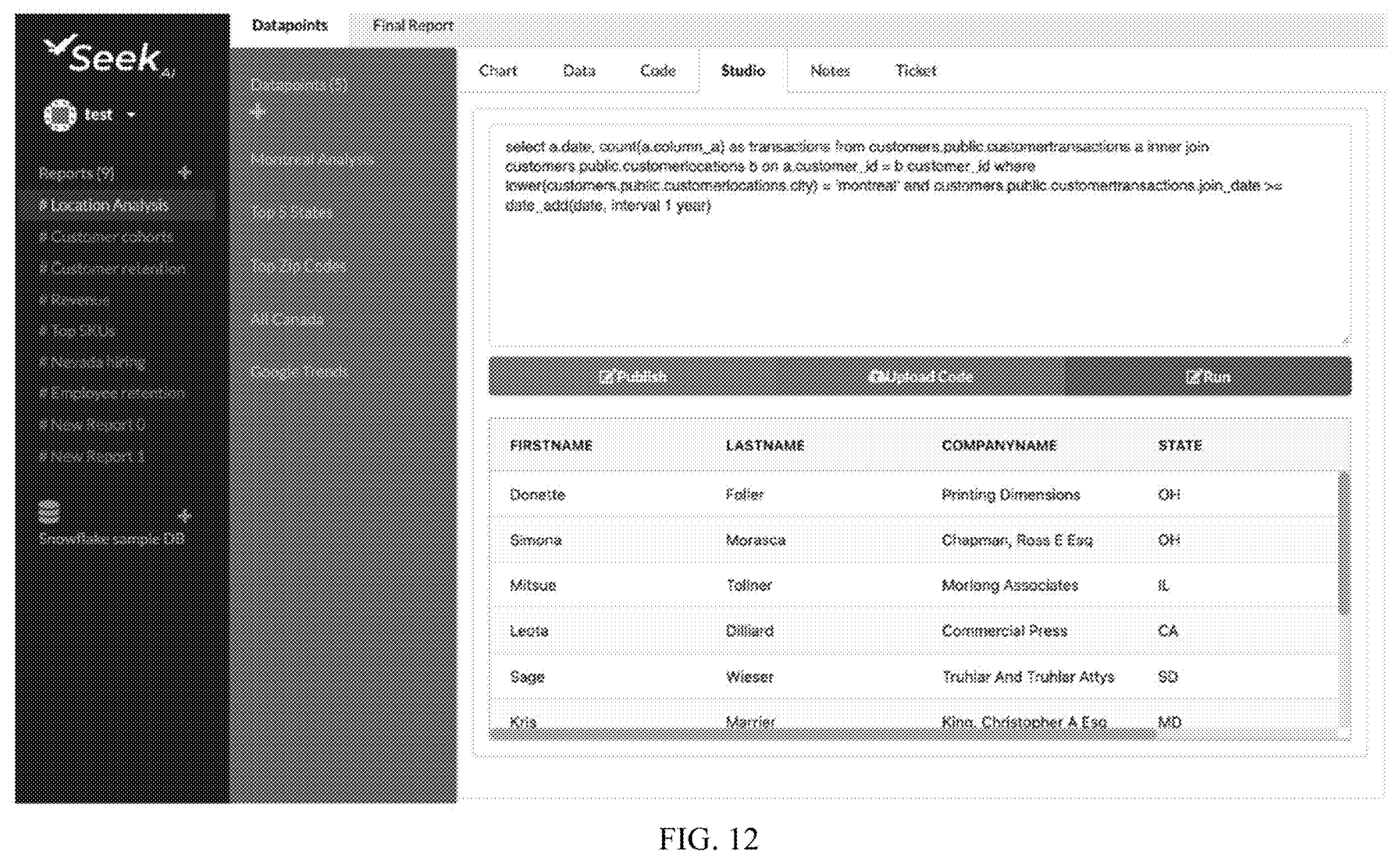

FIG. 12 shows step 8 of an example use case of a preferred embodiment. This example shows a quality assurance user device may verify the generated code by altering the generated code to provide the solution to the paraphrased query.

Figure 13:
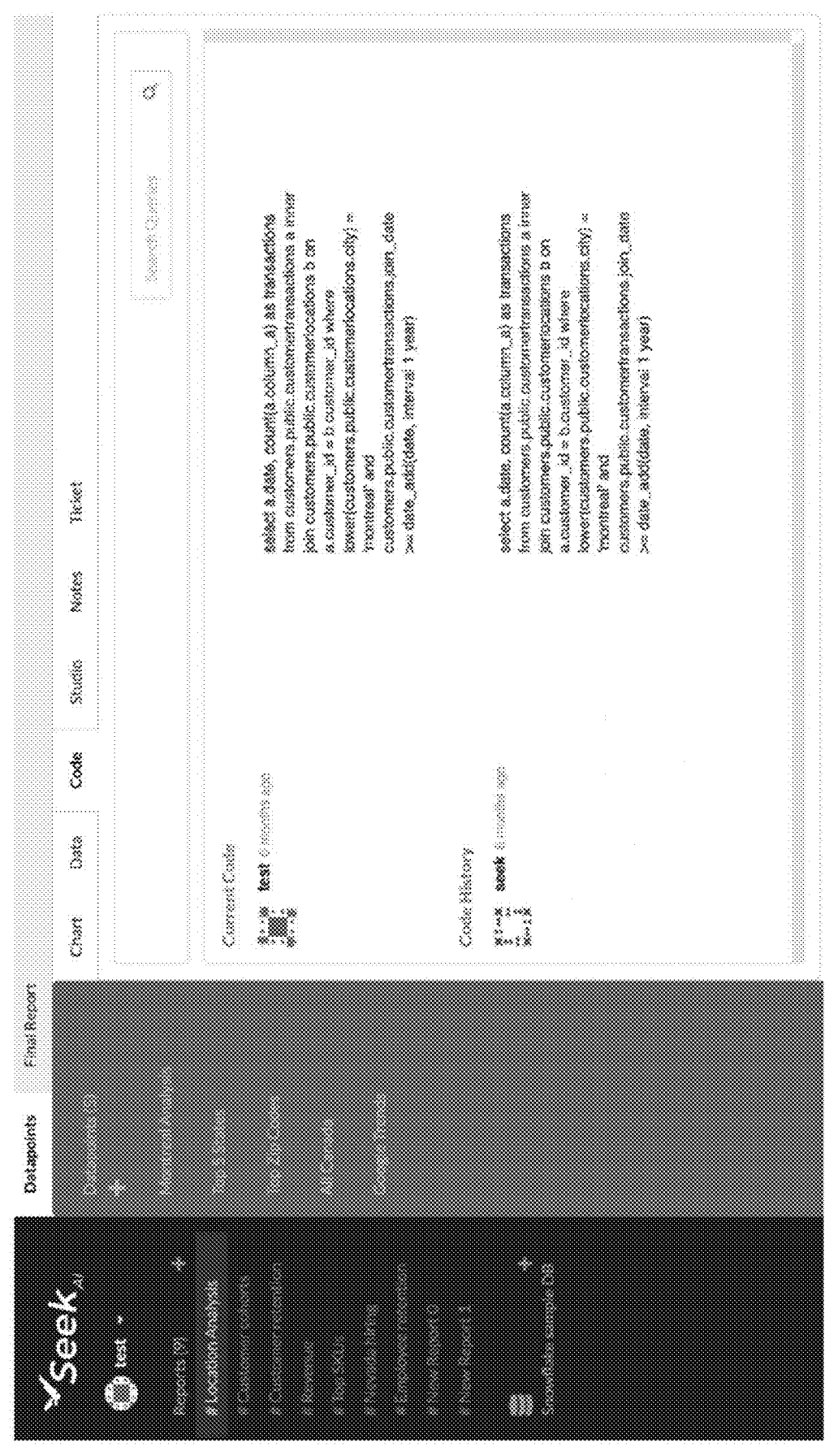

FIG. 13 shows step 9 of an example use case of a preferred embodiment. This example shows the code verified by a quality assurance user device.

Figure 14:
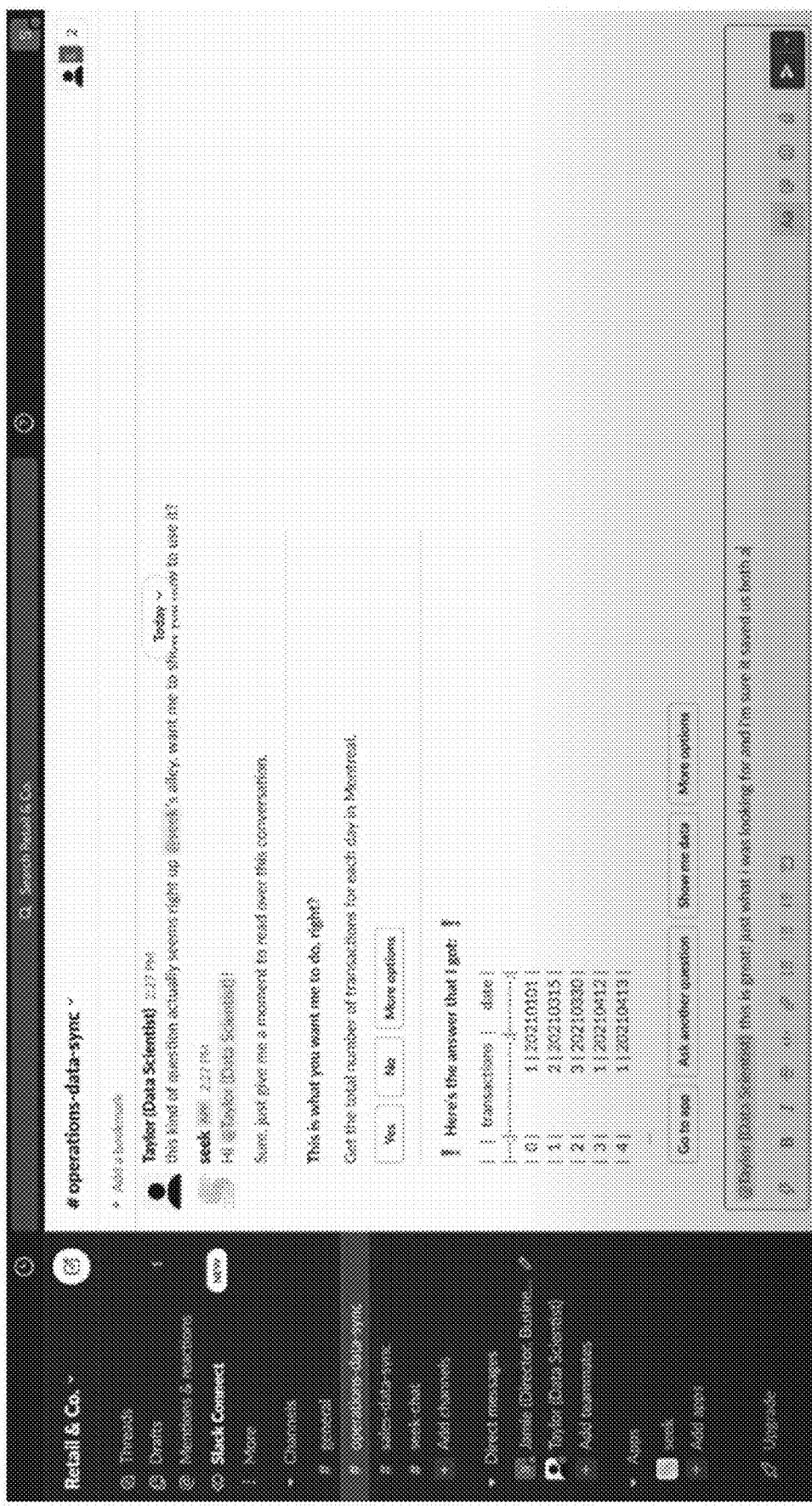
FIG. 14 illustrates an embodiment of the present invention directed to step 10 of an example use case.

FIG. 14 shows step 10 of an example use case of a preferred embodiment. This example shows the output of the verified code may be sent to the user device.

Figure 15:
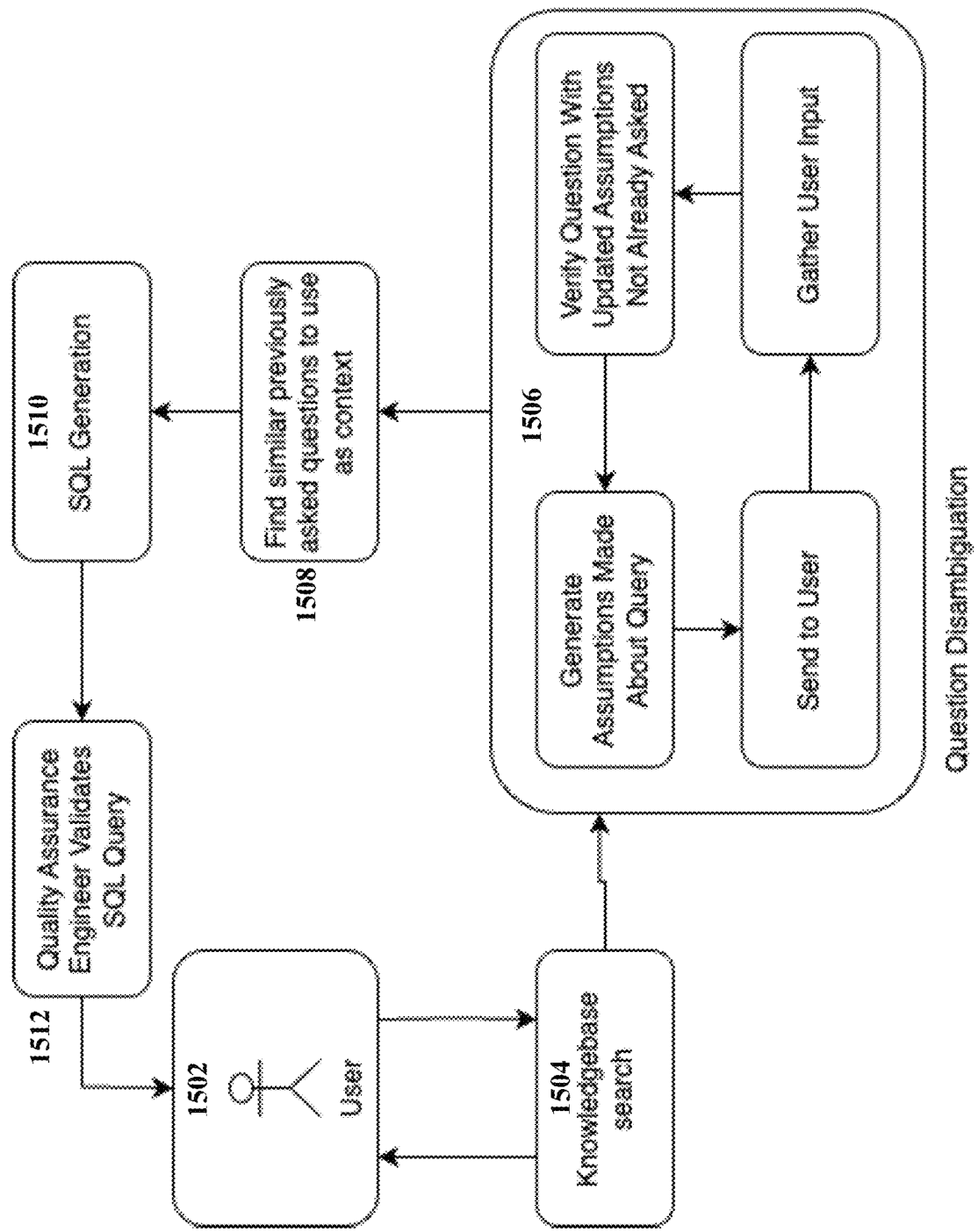
FIG. 15 illustrates an embodiment of the present invention directed to a workflow diagram.

FIG. 15 shows a workflow diagram depicting an overview of another preferred embodiment. The workflow diagram may be employed in any of the systems described herein or in the figures, or any other comparable system. The workflow diagram may be performed by any of the devices or systems described herein or in the figures, or any other comparable device or system. The following description of the workflow is not an example of how to implement the workflow but is not meant to be limiting in any way.

At step 1502, user input from a user associated with a user device may be received. The user input may comprise a query comprising conversational language. Conversational language may be informal language. Conversational language may comprise abbreviations and/or slang. Conversational language may have imperfect grammar. The query may propose a question to be answered. The query may be associated with data analytics. The query may be proposed by the user via a natural language interface, such as a chat application or other communication tool. The query may be input in various forms such as a text, a voice recording, a text file, a digital image, a portable document format, or any other compatible format. The natural language interface may comprise one or more integrated APIs to facilitate providing users data analytics and/or providing solutions to queries.

At step 1504, a machine learning model may conduct a knowledgebase search to determine if a solution to the query has previously been generated. A knowledge base search may comprise searching a database to determine if the query (and therefore the solution) has been previously input and stored in the database. The knowledge base search may be conducted by one of the APIs of the one or more integrated APIs that facilitate providing users data analytics and/or providing answers to queries.

If the query is stored in the database, a previously generated response associated with the query, which is also stored in the database, may be sent to the user device that input the query. The previously generated response may comprise a solution to the associated query. The solution may comprise code, such as SQL code, text, a voice recording, a text file, a digital image, a portable document format, or any other format receivable and/or compatible with the user device. The user device may receive the previously generated response. The user device may use the previously generated response and output to the user device the previously generated response.

At step 1506, if the query is not stored in the database, a quality assurance device may send a request for more information associated with the query to the user device. The request for more information may be based on an attempt to disambiguate the query. The request for more information may be based on a machine learning model generating assumptions associated with query.

Sending the request to the user device may comprise a request to verify the generated assumptions associated with query. The request for more information may be based on the quality assurance device rephrasing the query. For example, a query from a user device may be "What is the most dangerous product we sold last year to Company X?" A machine learning model may send the user device "I'm a little unclear as to what you mean by 'dangerous.' Can I assume that it means it has a hazard code in [501, 502, 503]? Can you confirm?" The user device may respond to the assumption "Yes." If the machine learning model still needs more information to effectively generate a solution, the machine learning model may continue making assumptions related to the original query input by the user device and ask the user device to verify the assumption.

Sending the request to the user device may comprise a request to verify the rephrased query. For example, a query from a user device may be "What is the most dangerous product we sold last year to Company X?" A quality assurance device may send the user device "Just want to confirm—by dangerous you mean a hazard code in the following list: [501, 502, 503]?" The user device may respond to the rephrased query "Yes." If the quality assurance device still needs more information to effectively generate a solution, the quality assurance device may continue rephrasing the query and asking the user device to verify the rephrased query.

At step 1508, a machine learning model may determine one or more previously input queries that are similar to the query input by the user device. This determination may be based on comparing the query input by the user device with queries stored in the database. This determination may be based on comparing a query that is semantically similar the query input by the user device with queries stored in the database.

At step 1510, a response to the query may be generated based on the one or more previously input queries and the more information requested. A variety of machine learning algorithms may be used to search for similar queries. For example, the following is a list of methods and algorithms that the machine learning model may use: text similarity algorithms such as cosine similarity, Jaccard similarity, or Levenshtein distance; semantic similarity algorithms such as Word2Vec, GloVe, and BERT to compare the semantic meaning of words in the query and previously input queries; natural language processing to extract key phrases and concepts from the query, and previously input queries; machine learning algorithms such as K-means clustering and SVM to group similar questions together; and/or rule-based algorithms such as decision trees, if-then statements, and fuzzy logic to identify patterns in the query and previously input query.

The generated response may be based on a machine learning model determining one or more assumptions associated with the query. The assumption associated with query may be based on the one or more previously input queries similar to the query. For example, a quality assurance device may provide the machine learning model previously input queries similar to the query. If the query is "What is the most dangerous product we sold last year to Company X?," the quality assurance device may provide the machine learning model "#Given the following schema: dangerous is equivalent to hazardous, #Given the following SQL statement: SELECT*FROM PRODUCTS WHERE HAZARD_CODE IN [301, 302, 303, 501, 502, 503], and #Given the following question: What are our most dangerous products?, #Please disambiguate what 'dangerous' means in this context." The machine learning model may provide the assumption: "According to the SQL query, 'dangerous' refers to having a hazard code in [301, 302, 303, 501, 502, 503]." The quality assurance device may verify the assumption is correct. This assumption may be used by the machine learning model to generate the response to the query.

The generated response to the query may comprise code, such as SQL, generated by a machine learning model, that comprises a solution to the query. Any variety of machine learning algorithms may be implemented by the machine learning model to generate the SQL, such as augmented large language model that utilizes a collection of documents containing relevant information as a proxy for memory, chat-based large language model such as ChatGPT or GPT-4, graph neural network that predicts the "framework" of the SQL, and semantics are filled in later.

At step 1512, a quality assurance device may verify the response comprises the solution to the query input by the user device. The verification may comprise determining the response does not comprise the solution and generating a new response that comprises the solution to the query. The verification may comprise determining an error in the response and altering the response, such that the error is fixed. The error may be associated with the syntax, grammar, format, structure, or similar aspect of the response.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The disclosures of each patent, patent application, and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A method comprising:
receiving a user query from a user device, wherein the user query comprises conversational language;
generating a paraphrased query from the user query using a natural language processor;
determining that the paraphrased query is not already present in a database of queries;
generating code via an artificial intelligence agent, the code comprising a solution to the paraphrased query, and generating a ticket associated with the code for verification from a quality assurance user device;
verifying the code comprises a solution to the paraphrased query, by the quality assurance user device and based on the ticket associated with the code;
adding the paraphrased query and the verified code to the database of queries; and
sending an output of the verified code to the user device.

2. The method of claim 1, wherein the receiving the user query further comprises receiving the user query by a chat application programming interface installed on a communication tool used by the user device.

3. The method of claim 1, wherein the natural language processor further comprises a machine learning application programming interface.

4. The method of claim 1, wherein the artificial intelligence agent further comprises a query generation application programing interface.

5. The method of claim 1, wherein the generating the ticket associated with the code further comprises generating the ticket associated with the code by a quality assurance ticketing server.

6. The method of claim 5, wherein the quality assurance ticketing server assigns the quality assurance user device to the ticket for verification of the code.

7. The method of claim 1, wherein the verifying the code further comprises the quality assurance user device determining the code comprises the solution to the paraphrased query.

8. The method of claim 1, wherein the verifying the code further comprises the quality assurance user device determining the code does not comprise the solution to the paraphrased query and altering the code, such that, the code comprises the solution to the paraphrased query.

9. A method comprising:
receiving a user query from a user device, wherein the user query comprises conversational language;
generating a paraphrased query from the user query using a natural language processor;
determining that the paraphrased query is already present in a database of queries;
receiving the code associated with the paraphrased query from the database of queries; and
sending an output of the code to the user device.

10. The method of claim 9, wherein the receiving the user query further comprises receiving the user query by a chat application programming interface installed on a communication tool used by the user device.

11. The method of claim 9, wherein the natural language processor further comprises a machine learning application programming interface.

12. A system comprising:
a user device;
a natural language processor;
an artificial intelligence agent;
a database of queries;
a quality assurance user device; and
a plurality of application programming interfaces configured to:
receive a user query from the user device, wherein the user query comprises conversational language;
generate a paraphrased query from the user query using the natural language processor;
determine that the paraphrased query is not already present in the database of queries;
generate code via the artificial intelligence agent, the code comprising a solution to the paraphrased query, and generating a ticket associated with the code for verification from the quality assurance user device;
verify the code comprises a solution to the paraphrased query, by the quality assurance user device and based on the ticket associated with the code;
add the paraphrased query and the verified code to the database of queries; and
send an output of the verified code to the user device.

13. The system of claim 12, wherein the plurality of application programming interfaces configured to receive the user query is further configured to receive the user query by a chat application programming interface installed on a communication tool used by the user device.

14. The system of claim 12, wherein the natural language processor further comprises a machine learning application programming interface.

15. The system of claim 12, wherein the artificial intelligence agent further comprises a query generation application programing interface.

16. The system of claim 12, wherein the plurality of application programming interfaces configured to generate the ticket associated with the code is further configured to generate the ticket associated with the code by a quality assurance ticketing server.

17. The method of claim 16, wherein the quality assurance ticketing server assigns a quality assurance user device to the ticket for verification of the code.

18. The system of claim 12, wherein the plurality of application programming interfaces configured to verify the code further comprises the quality assurance user device determining the code comprises the solution to the paraphrased query.

19. The system of claim 12, wherein the plurality of application programming interfaces configured to verify the code further comprises the quality assurance user device determining the code does not comprise the solution to the paraphrased query and altering the code, such that, the code comprises the solution to the paraphrased query.

20. A method comprising:
receiving, from a user device, user input, wherein the user input comprises a query comprising conversational language;
sending, by a quality assurance device and based on determining that the query is not stored in a database of queries, a request for information associated with the query;
receiving, from the user device, the requested information;
generating, based on the request information and determining one or more previously input queries similar to the query, a response to the query;
verifying, by the quality assurance device, the response comprises a solution to the query;
storing, in the database of queries, the query and the verified response; and
sending the response to the user device.

21. The method of claim 20, wherein the sending the request for information associated with the query further comprises:
generating, by a machine learning model, assumptions associated with the query; and
sending, to the user device, a request to verify the assumptions generated.

22. The method of claim 20, wherein the sending the request for information associated with the query further comprises:
rephrasing, by a quality assurance device and based on the query, the query; and
sending, the user device, a request to verify the rephrased query.

23. The method of claim 20, wherein the determining one or more previously input queries similar to the query further comprises at least one of:
comparing, by a machine learning model, the query with the queries stored in the database of queries; or
comparing, by the machine learning model, a query semantically similar to the query with the queries stored in the databased of queries.

24. The method of claim 20, wherein generating a response to the query is based on determining, by a machine learning model and based on the one or more previously input queries similar to the query, one or more assumptions associated with the query.

25. The method of claim 20, wherein the generating a response to the query further comprises generating, by a machine learning model, code comprising a solution to the query.

26. The method of claim 20, wherein the verifying the response comprises the solution to the query further comprises:

determining, by the quality assurance device, the response does not comprise the solution to the query; and generating, by the quality assurance device and based on the response, a new response that comprises the solution to the query.

27. The method of claim 20, wherein the receiving the user input further comprises receiving the user input via a chat application programming interface installed on a communication tool used by the user device.

\* \* \* \* \*